United States Patent
Downs et al.

(10) Patent No.: US 12,006,269 B2
(45) Date of Patent: Jun. 11, 2024

(54) MULTILAYER PROTECTIVE COATING SYSTEMS FOR GAS TURBINE ENGINE APPLICATIONS AND METHODS FOR FABRICATING THE SAME

(71) Applicant: HONEYWELL INTERNATIONAL INC., Charlotte, NC (US)

(72) Inventors: John Downs, Morris Plains, NJ (US); Bahram Jadidian, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 17 days.

(21) Appl. No.: 17/445,889

(22) Filed: Aug. 25, 2021

(65) Prior Publication Data
US 2023/0063923 A1 Mar. 2, 2023

(51) Int. Cl.
| | |
|---|---|
| C04B 41/89 | (2006.01) |
| C04B 35/80 | (2006.01) |
| C04B 41/00 | (2006.01) |
| C04B 41/50 | (2006.01) |
| C04B 41/52 | (2006.01) |

(Continued)

(52) U.S. Cl.
CPC ............ C04B 41/522 (2013.01); C04B 35/80 (2013.01); C04B 41/0072 (2013.01); C04B 41/5024 (2013.01); C04B 41/87 (2013.01); C04B 41/89 (2013.01); C23C 28/04 (2013.01); F01D 9/02 (2013.01); *C04B 2235/3826* (2013.01); *C04B 2235/3873* (2013.01); *C04B 2235/5244* (2013.01)

(58) Field of Classification Search
CPC . B32B 18/00; F01D 5/288; C04B 41/52–526; C04B 41/85; C04B 41/87; C04B 41/89; C23C 14/08; C23C 14/083; C23C 16/40; C23C 16/405; C23C 28/04; C23C 28/042; C23C 28/30; C23C 28/34; C23C 28/345; C23C 28/3455; C23C 28/40; C23C 28/42
See application file for complete search history.

(56) References Cited

U.S. PATENT DOCUMENTS 7,740,960 B1 * 6/2010 Zhu .................. C04B 41/009
428/689
8,173,206 B2    5/2012 Boutwell et al.
(Continued)

OTHER PUBLICATIONS

Poerschke, David, et al. "Interaction of Yttrium Disilicate Environmental Barrier Coatings with Calcium-Magnesium-Iron Alumino-Silicate Melts," Dec. 2017, downloaded from https://www.sciencedirect.com/science/article/pii/S1359645417310091 on Apr. 19, 2021.

*Primary Examiner* — Z. Jim Yang
(74) *Attorney, Agent, or Firm* — Lorenz & Kopf LLP

(57) ABSTRACT

A multilayer protective coating system includes a turbine engine component substrate formed of a ceramic matrix composite material, an environmental barrier coating layer including a rare earth disilicate material deposited directly on the substrate, and a plurality of pairs of alternating layers of the rare earth disilicate material and a rare earth monosilicate material deposited and sintered directly on the environmental barrier coating layer. Each layer of the plurality of pairs of alternating layers is relative less thick as compared with the environmental barrier coating layer.

20 Claims, 5 Drawing Sheets

(51) Int. Cl.
*C04B 41/87* (2006.01)
*C23C 28/04* (2006.01)
*F01D 9/02* (2006.01)

(56) References Cited

U.S. PATENT DOCUMENTS

| | | |
|---|---|---|
| 9,139,480 B2 | 9/2015 | Raybould et al. |
| 9,713,912 B2 | 7/2017 | Lee |
| 10,094,236 B2 | 10/2018 | Luthra |
| 10,351,480 B2 | 7/2019 | Lee |
| 10,851,656 B2 | 12/2020 | Gong et al. |
| 11,325,869 B1* | 5/2022 | Lee ................. C04B 41/52 |
| 11,619,137 B1* | 4/2023 | Blair ................. F01D 9/041 |
| | | 416/241 R |
| 11,878,949 B1* | 1/2024 | Zhu ................. C04B 41/89 |
| 2006/0154093 A1* | 7/2006 | Meschter ............ C23C 28/42 |
| | | 428/457 |
| 2009/0162533 A1 | 6/2009 | Kirby et al. |
| 2009/0162556 A1 | 6/2009 | Boutwell et al. |
| 2009/0162674 A1 | 6/2009 | Boutwell et al. |
| 2013/0136915 A1 | 5/2013 | Naik |
| 2013/0189531 A1* | 7/2013 | Lee .................. C09D 5/18 |
| | | 428/448 |
| 2013/0344319 A1* | 12/2013 | Zhu .................. C04B 41/009 |
| | | 428/335 |
| 2014/0255680 A1* | 9/2014 | Lee .................. C04B 41/009 |
| | | 428/312.6 |
| 2014/0272197 A1* | 9/2014 | Lee .................. C23C 14/30 |
| | | 427/596 |
| 2015/0159507 A1 | 6/2015 | Sivaramakrishnan et al. |
| 2016/0153288 A1 | 6/2016 | Luthra |
| 2016/0376691 A1 | 12/2016 | Wadley et al. |
| 2017/0016335 A1* | 1/2017 | Kirby ................. F01D 25/005 |
| 2017/0044930 A1* | 2/2017 | Luthra ............... C04B 41/89 |
| 2018/0022649 A1 | 1/2018 | Matsumoto et al. |
| 2018/0354866 A1 | 12/2018 | Luthra |
| 2019/0092702 A1* | 3/2019 | Yamaguchi ........... C04B 41/89 |
| 2019/0093497 A1* | 3/2019 | Ndamka ............. C04B 41/5024 |
| 2019/0345074 A1* | 11/2019 | Pin .................. C04B 41/4527 |
| 2019/0382880 A1* | 12/2019 | He .................. C23C 16/0281 |
| 2020/0123071 A1* | 4/2020 | Ndamka ............. C04B 41/4543 |
| 2020/0185203 A1* | 6/2020 | Lubomirsky ........ C23C 16/4586 |
| 2020/0378010 A1 | 12/2020 | Wan et al. |
| 2021/0054749 A1* | 2/2021 | Jackson ............. F01D 5/284 |
| 2021/0140327 A1* | 5/2021 | Bianchi ............. C04B 41/5042 |
| 2021/0188721 A1* | 6/2021 | Shi ................. C04B 41/89 |
| 2021/0396150 A1* | 12/2021 | Golden .............. C23C 4/134 |
| 2022/0055954 A1* | 2/2022 | Yang ................ C04B 35/62873 |
| 2022/0259111 A1* | 8/2022 | Matsumoto ........... C04B 41/52 |

* cited by examiner

MULTILAYER PROTECTIVE COATING SYSTEMS FOR GAS TURBINE ENGINE APPLICATIONS AND METHODS FOR FABRICATING THE SAME

TECHNICAL FIELD

The present disclosure generally relates to multilayer protective coatings for gas turbine engine applications and methods for fabricating such multilayer coatings.

BACKGROUND

Turbine engines are used as the primary power source for various kinds of aircraft and other vehicles. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary and rotary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices.

High temperature turbine components such as turbine blades, shrouds, and nozzles made from silicon nitride or silicon carbide and their composites have the potential to appreciably increase the operating temperatures of turbine engines. The high temperature and high pressure environment of the turbine engine as well as the high gas velocity can cause erosion of silicon based ceramics. The mechanism of some of the erosion loss is due to the formation of $SiO_2$ and SiO gas. Typically, combustion gas environments, including turbine engines, contain about 10% water vapor. Oxygen containing water in the turbine reacts with silicon nitride or silicon carbide to form silica scale on silicon based ceramic surfaces. Water vapor can also react with the silica scale to form silicon hydroxide, which is volatile. Evaporation of silicon hydroxide from ceramic surfaces and erosion of ceramic caused by high speed combustion gases passing over ceramic surfaces leads to the loss of ceramic material from ceramic combustor and turbine components.

More recently, rare earth disilicate environmental barrier coatings (EBCs) are used as protective coatings on silicon nitride and silicon carbide/silicon carbide composite components in turbine engine hot zones like high-pressure turbine (HPT) shrouds and nozzles. The EBC is necessary to prevent attack of the base ceramic from the steam in the gas flow. In many designs, HPT surface temperatures are targeted in excess of 2600° F. to improve performance characteristics and engine efficiency.

Existing EBCs that are based on rare earth disilicates, however, have a temperature limit where the disilicate decomposes to the more stable rare earth monosilicate above 2400° F. in the HPT environment. The monosilicate phase that forms is porous and has a higher coefficient of thermal expansion (CTE) compared to the substrate or the EBC. Because of the porosity in the monosilicate layer that forms, the underlying EBC is continually exposed to exhaust gasses and the layer will continue to grow. Unfortunately, because of the CTE difference, an EBC of monosilicate cannot be made for silicon nitride or SiC/SiC substrates. Because the CTE difference is high enough, cyclic heating to operating temperatures will cause stresses at the interfaces in thick coatings that will cause delamination of the coating.

Accordingly, there is a need for an improved EBC and method to apply the coating for a high temperature (>2600° F. (>1425° C.)) barrier between the oxidizing environment of a HPT section and a substrate of silicon nitride or silicon carbide. There is also a need for an EBC over a silicon-based substrate that will resist delamination during cyclic heating to such high operating temperatures. There is as well a need to coat complex parts with a uniform dense oxidation resistant coating at a minimal cost. Furthermore, other desirable features and characteristics of the present invention will become apparent from the subsequent detailed description of the invention and the appended claims, taken in conjunction with the accompanying drawings and this background of the invention.

BRIEF SUMMARY

The present disclosure generally relates to multilayer protective coatings for gas turbine engine applications and methods for fabricating such coatings. In one embodiment, a multilayer protective coating system includes a turbine engine component substrate formed of a ceramic matrix composite material, an environmental barrier coating layer including a rare earth disilicate material deposited directly on the substrate, and a plurality of pairs of alternating layers of the rare earth disilicate material and a rare earth monosilicate material deposited and sintered directly on the environmental barrier coating layer. Each layer of the plurality of pairs of alternating layers is relative less thick as compared with the environmental barrier coating layer.

In another embodiment, a method of applying a multilayer protective coating to a substrate includes the steps of providing or obtaining a turbine engine component substrate formed of a ceramic matrix composite material, depositing an environmental barrier coating layer comprising a rare earth disilicate material directly on the substrate, and depositing and sintering a plurality of pairs of alternating layers of the rare earth disilicate material and a rare earth monosilicate material directly on the environmental barrier coating layer. Each layer of the plurality of pairs of alternating layers is relative less thick as compared with the environmental barrier coating layer.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Silicon carbide-silicon carbide matrix ("SiC—SiC") and silicon nitride ("$Si_3N_4$" or simply "SiN") materials are currently limited in operational use temperature by oxidation which begins around 2400° F., or even lower in some instances. While there are many coating methods that have been put forth, all claiming to resolve the issues of other methods, they each have issues of their own. In other words, gaining a benefit in a property from one process or material often leads to a shortfall in another property. The present disclosure provides an approach to creating an environmental barrier coating (EBC) for SiC—SiC or SiN substrate materials to allow the use temperature to be increased to about 2600° F. to about 2800° F. The approach employs a rare earth disilicate EBC that is disposed onto the substrate, over which is then disposed a plurality of alternating thin layers of a rare earth monosilicate material and the rare earth disilicate EBC. This multilayer coating architecture will be able to manage the thermal mismatch stresses that arise in the EBCs when there is a monosilicate surface layer present that forms during operation. The ability to maintain a monosilicate surface by providing layers that are too thin to spall will allow for higher engine temperatures with silicon nitride or SiC/SiC parts in the HPT section. The treatment will improve engine performance by increasing engine efficiency. Being able to increase cycle temperatures allows for higher thermodynamic efficiency. The possibility of the reliable use of ceramic components in the HPT lower the engine weight. Ceramic parts also do not need the same cooling requirements as metallic components reducing the secondary flow needs in the engine. A more reliable coating can also increase part life and increase intervals between replacement.

Turbine Engine/Turbine Section

Figure 1:
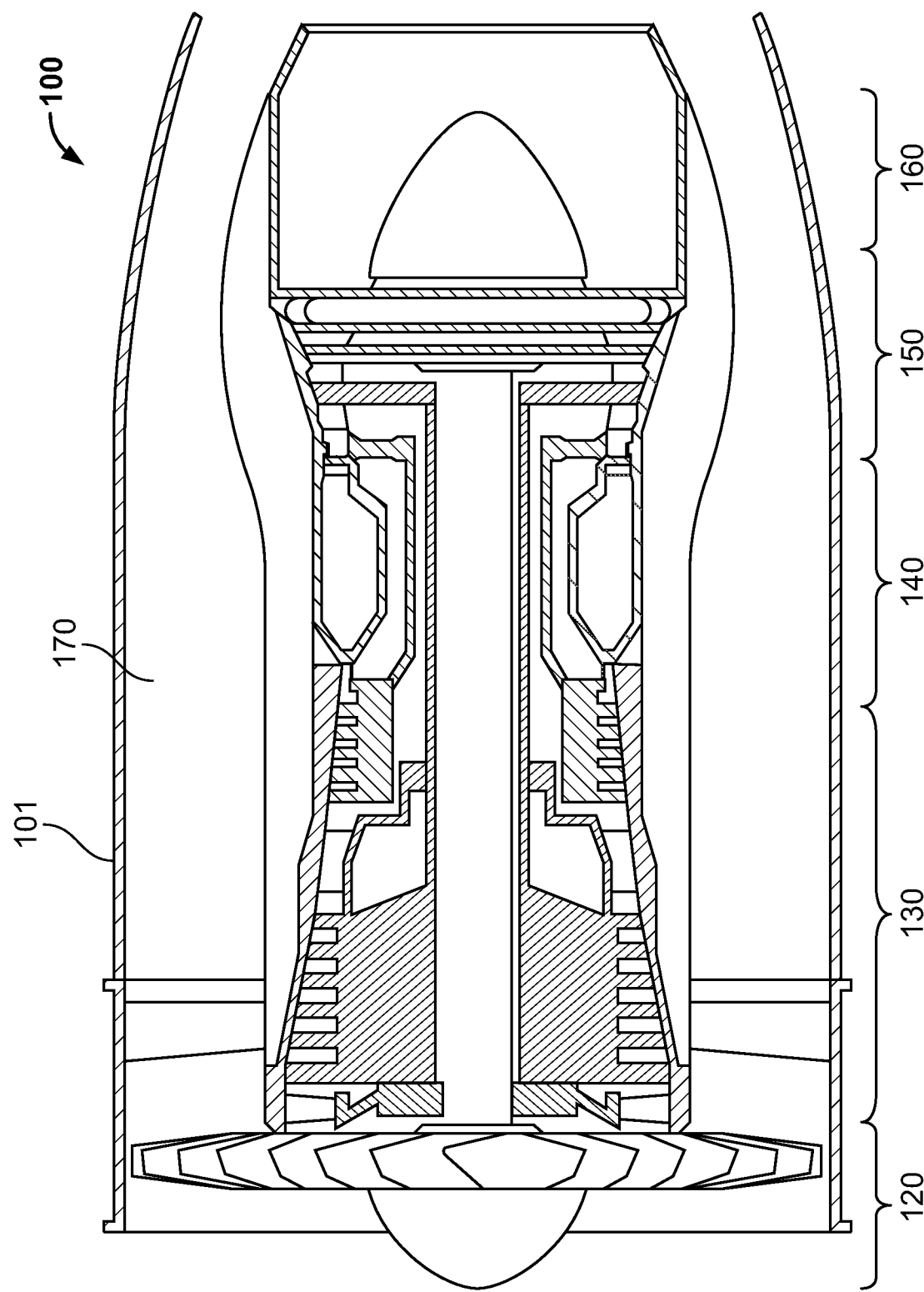
FIG. 1 is a partial cross-sectional view of a gas turbine engine in accordance with an exemplary embodiment.

As initially noted, embodiments of the present disclosure find particular application in the "hot" or turbine sections of gas turbine engines. Turning now to the Figures, FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. The turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
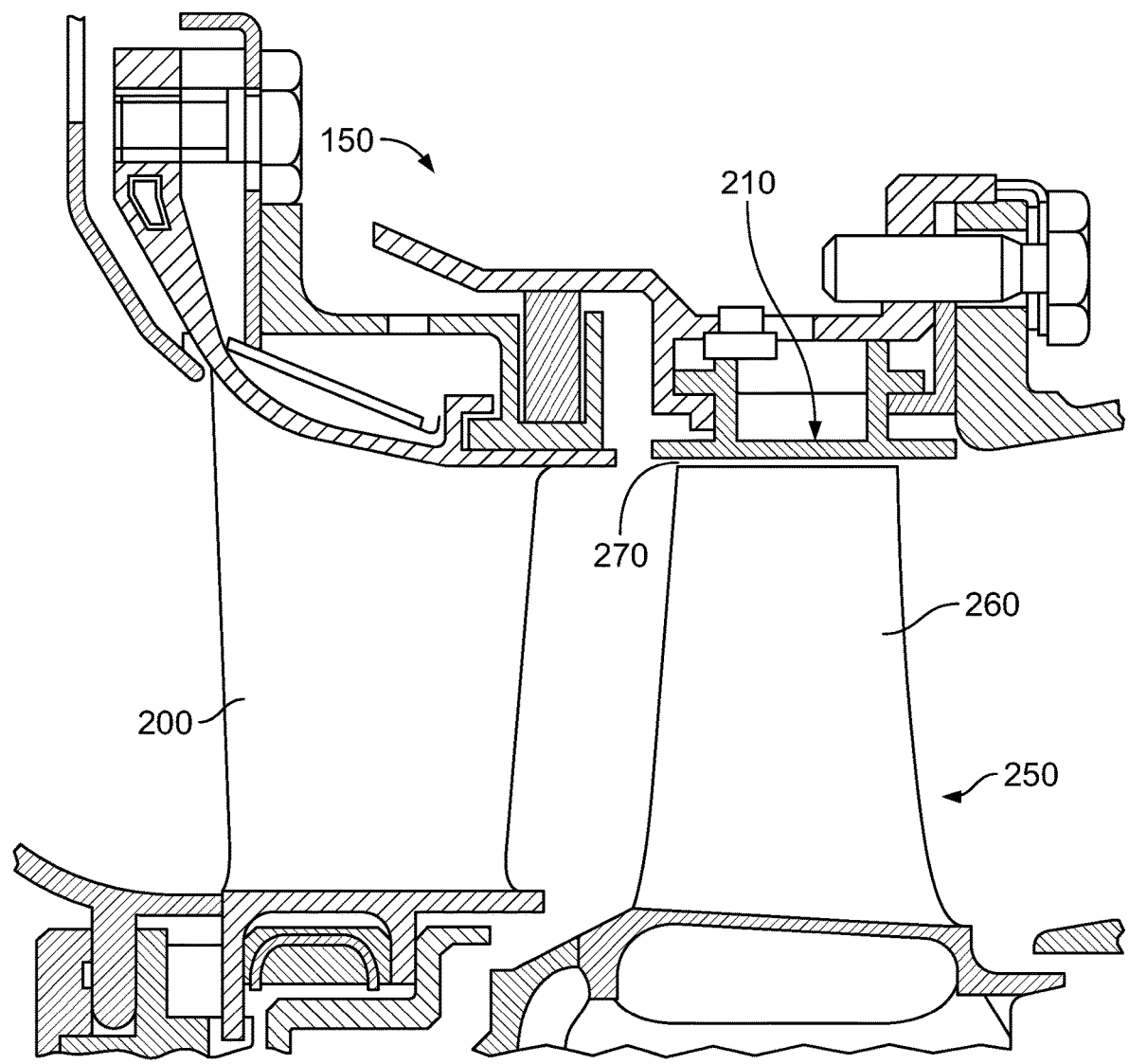
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g., compressor section 130 of FIG. 1) is directed. The cylindrical shroud 210 is disposed concentric to the rotor 250 to optimize aerodynamic efficiency and forms a radial gap (i.e., blade running clearance) 270 with an outermost diameter of the rotor 250. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are coating with the EBC/TBC coatings of the present disclosure, such as the shroud or nozzles.

Ceramic Substrate Materials

As noted above, various hot section components as illustrated in FIG. 2 may be formed of a silicon nitride or silicon carbide fiber/silicon carbide matrix composite material. In one example, as generally known in the art, a SiC—SiC ceramic matrix composite material may include a SiC fiber-bonded ceramic or a SiC fiber-bonded ceramic having a graded structure, for example. Regarding the SiC fiber-bonded ceramic, such a material may generally include inorganic fibers having mainly a sintered SiC structure, each of which contains 0.01-1 wt. % of oxygen (O) and at least one or more metal atoms of metal atoms in Groups 2A, 3A, and 3B, and a 1-100 nm interfacial layer containing carbon (C) as a main component formed between the fibers. Further, the SiC fiber-bonded ceramic having a graded structure may generally include a matrix, the matrix including inorganic fibers having mainly a sintered SiC structure containing 0.01-1 wt. % of oxygen (O) and at least one or more metal atoms of metal atoms in Groups 2A, 3A, and 3B, and a 1-100 nm interfacial layer containing carbon (C) and/or boron nitride (BN) as a main component formed between the fibers, a surface portion having a ceramic structure including mainly SiC and being formed on at least part of the surface of the matrix, a boundary portion interposed between the surface portion and the matrix and having a graded structure that changes from the structure of the matrix to the structure of the surface portion gradually and continuously.

These SiC—SiC materials include a volume fraction of about 90% or more of SiC-based fibers. Such materials have high fracture toughness and are insensitive to defects. The fiber material constituting the SiC fiber-bonded ceramic is mainly inorganic fibers that include a sintering structure containing mainly SiC and/or SiCN, contain about 0.01-1 wt. % of oxygen (O) and at least one metal atom selected from the group including metal atoms in Groups 2A, 3A, and 3B, and are bonded very close to the closest-packed structure. The inorganic fibers including a sintered SiC structure include mainly a sintered polycrystalline n-SiC structure, or include crystalline particulates of β-SiC and C. In a region containing a fine crystal of carbon (C) and/or an extremely small amount of oxygen (O), where β-SiC crystal grains sinter together without grain boundary second phase interposed therebetween, a strong bond between SiC crystals can be obtained.

Rare Earth Disilicate EBC Layer

Disposed over the ceramic substrate surface is a rare earth disilicate EBC layer. As used herein, the term "rare earth" refers to cations including: Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), or Lutetium (Lu). The disilicate EBC layer is provided as an environmental barrier coating to enhance the operating capabilities of a gas turbine engine component fabricated with the SiC—SiC/SiN substrate as described above. For example, in one embodiment, the disilicate EBC layer is provided for protection in high temperature and high pressure environments of the turbine engine, which can cause oxidation and eventual erosion of silicon based ceramics. In particular embodiments, the addition of the disilicate EBC layer, in part, functions to raise the suitable operating temperature of a component formed with a ceramic substrate to about 2600° F. to about 2800° F. or greater.

The disilicate EBC layer may generally include a rare-earth disilicate material. As known in the art, rare earth elements include, among various others, strontium, lanthanum, yttrium, scandium, and others. For some embodiments, disilicate of yttrium and scandium are particularly suitable. The disilicate EBC layer may be applied over the ceramic substrate using any known methods. These methods include, but are not limited to, plasma spraying, physical vapor deposition (PVD), and electron beam physical vapor deposition (EB-PVD), and dipping.

Current EBC Layers—Ideal and Typical Operational Results

Figure 3:
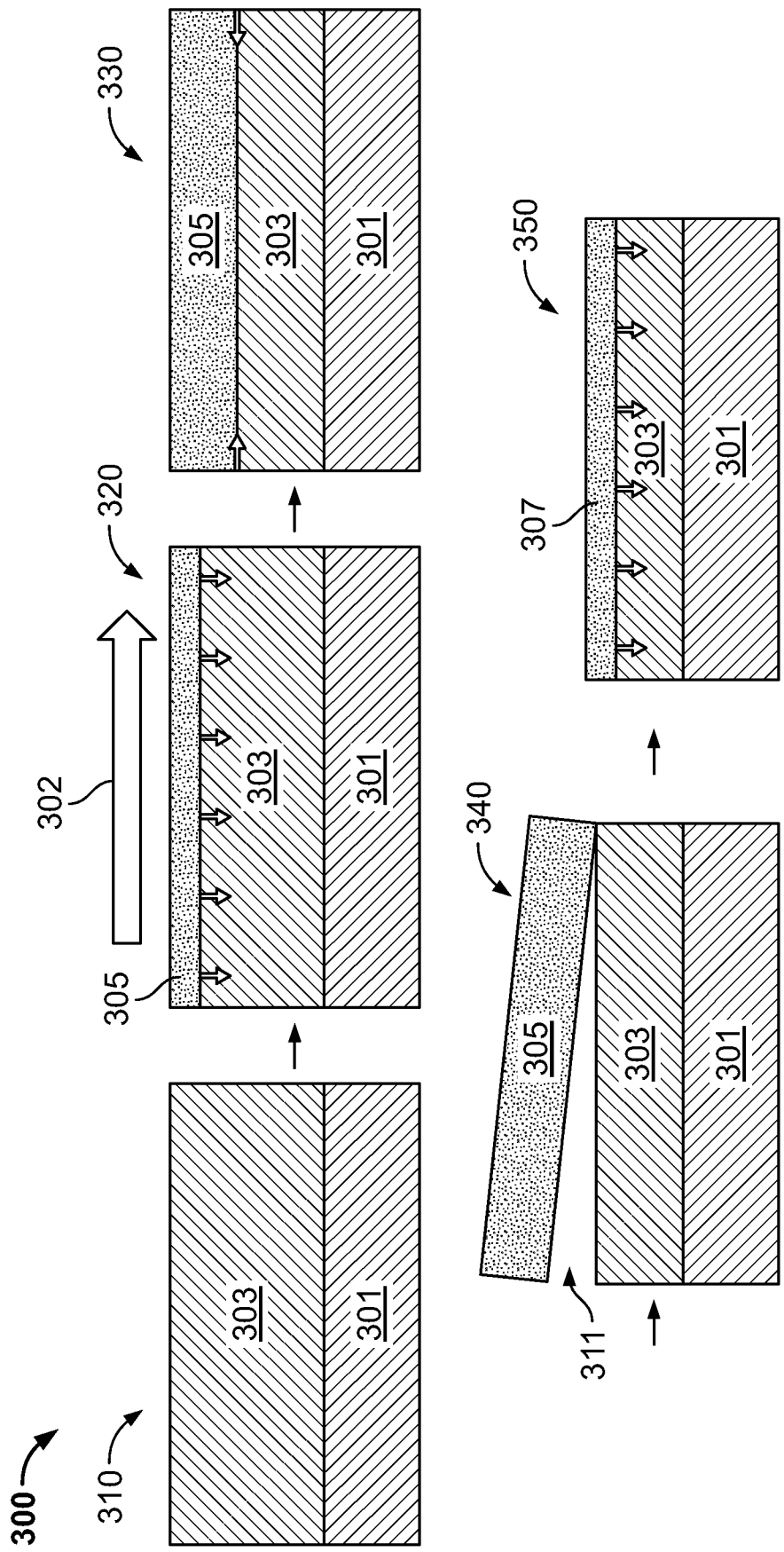
FIG. 3 illustrates, in cross section, an ideal case process of a ceramic substrate having a known environmental barrier coating thereon in operation.

Referring now to FIG. 3, illustrated is a process flow diagram 300 utilizing cross sectional views (310, 320, 330, 340, and 350) of a ceramic substrate coated with a rare earth disilicate EBC, as has been practiced in the art, to demonstrate an ideal scenario of operational use. In the ideal case, starting with view 310, the ceramic substrate 301 is coated with a thickness of rare earth disilicate EBC 303. The EBC 303 is fully dense on the ceramic substrate 301. As shown next at view 320, when exposed to the high temperatures of the HPT hot gas flow path (arrow 302), the disilicate with decompose into the porous rare earth monosilicate layer 305, progressing from the surface inward to the substrate 301. The monosilicate 305 formed will grow at an even rate into the thickness of the EBC 303. Once a critical thickness is reached, as shown at view 330, the induced stresses from the CTE mismatch will be high enough to cause delamination between the rare earth monosilicate 305 and the EBC disilicate layer 303, as shown at view 340 (delamination indicated with arrow 311). The monosilicate layer 305 will be shed and a fresh layer of disilicate 303 will be exposed and the process will repeat until all EBC 303 is transformed, as indicated at view 350 with the formation of fresh rare earth monosilicate layer 307, which likewise is growing progressively towards the ceramic substrate 301. The CTE mismatch between the substrate 301 and the monosilicate 305/307 is greater than the mismatch between the monosilicate/disilicate (305/307, 303), so eventually, the substrate 301 will be fully exposed to the exhaust gasses.

Figure 4:
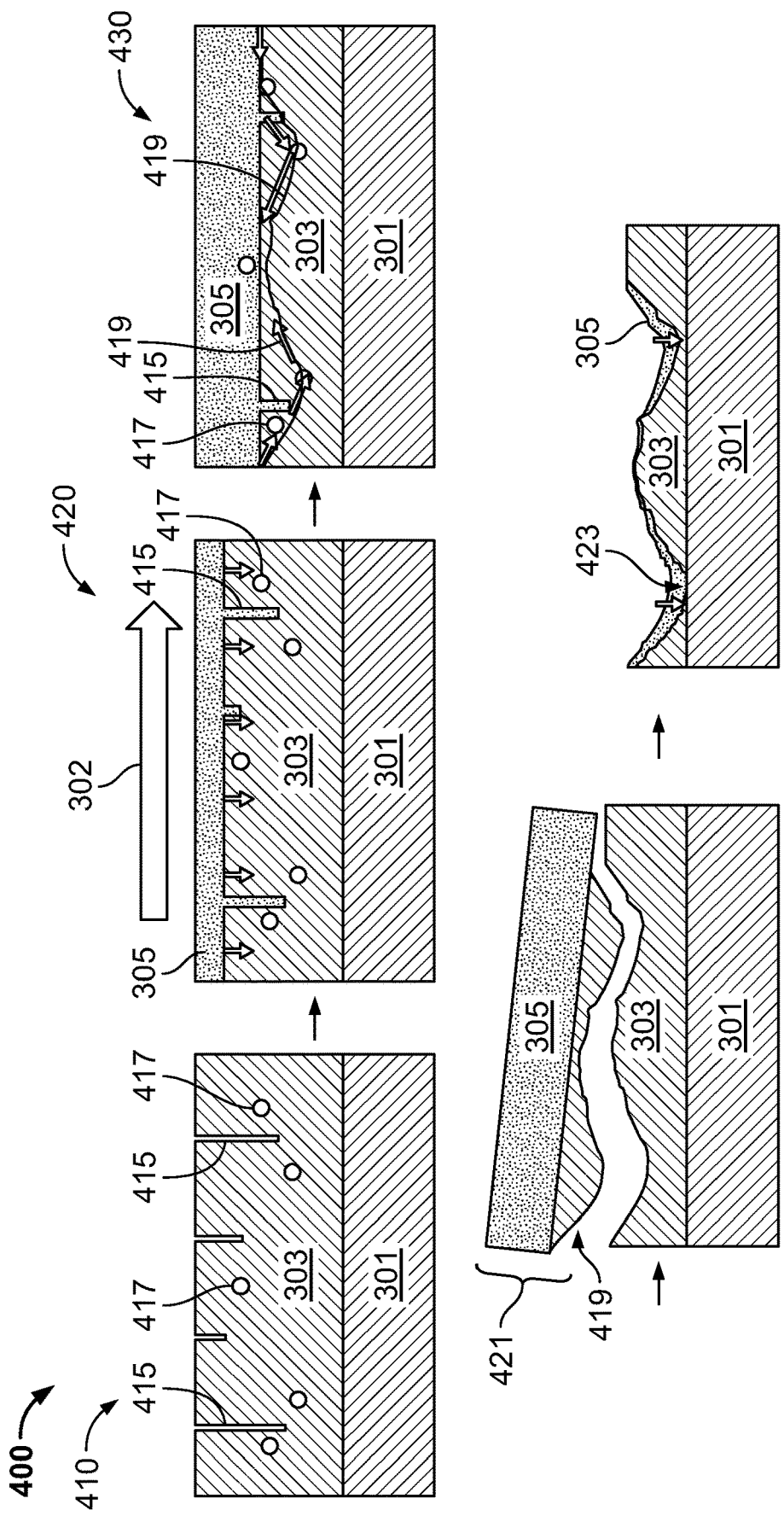
FIG. 4 illustrates, in cross section, a typical case process of a ceramic substrate having a known environmental barrier coating thereon in operation.

However, the ideal case shown in FIG. 3 is typically not observed in practice. Referring now to FIG. 4, illustrated is a process flow diagram 400 utilizing cross sectional views (410, 420, 430, 440, and 450) of a ceramic substrate coated with a rare earth disilicate EBC, as has been practiced in the art, to demonstrate a typical scenario of operational use. In a typical case, as shown in view 410, there are defect-like surface cracks 415 going down in to the disilicate EBC 303, as well as and pores 417 in the EBC 303. Because of these defects, the growth rate of the monosilicate layer 305 will be accelerated, particularly into the cracks 415 as shown in view 420, and the cracks 415 developed between the monosilicate 305 and disilicate 303 will likely form faster resulting in a faster spallation rate and faster and inconsistent loss of the EBC 303, as shown in view 430 by line 419 illustrating the inconsistent loss. Spallation may occur along line 419 as indicated in view 440, resulting in some disilicate 303 being cleaved along with the monosilicate 305 (section 421). This, again, accelerates deterioration of the EBC 303, as indicated in view 450 where portions of the monosilicate 305 are in contact with the substrate 301 (shown by reference numeral 423), wherein no disilicate EBC 303 remains. Once the entire coating 303 spalls, the ceramic substrate 301 will be exposed to the steam in the combustion gas and it will corrode, causing quick recession of the ceramic substrate 301 and loss of efficiency due to an increased blade tip clearance. In extreme cases localized thinning of the substrate 301 from corrosion can result in fracture of the part.

Multilayer Coating Approach

Embodiments of the present disclosure provide novel methods for applying multilayer EBC coatings to accommodate the stresses associated with the CTE mismatch of the more stable monosilicate layer to avoid the spallation observed in connection with FIGS. 3 and 4, above, while maintaining adequate oxidation resistance and adhesion provided by the EBC, thus allowing for hotter more efficient engine cycles. This coating approach will manage the coating failure and result in the required, if not longer part life at the higher operating temperatures previously noted. This approach can also be scaled to increase life further depending on how many layers are applied.

Figure 5:
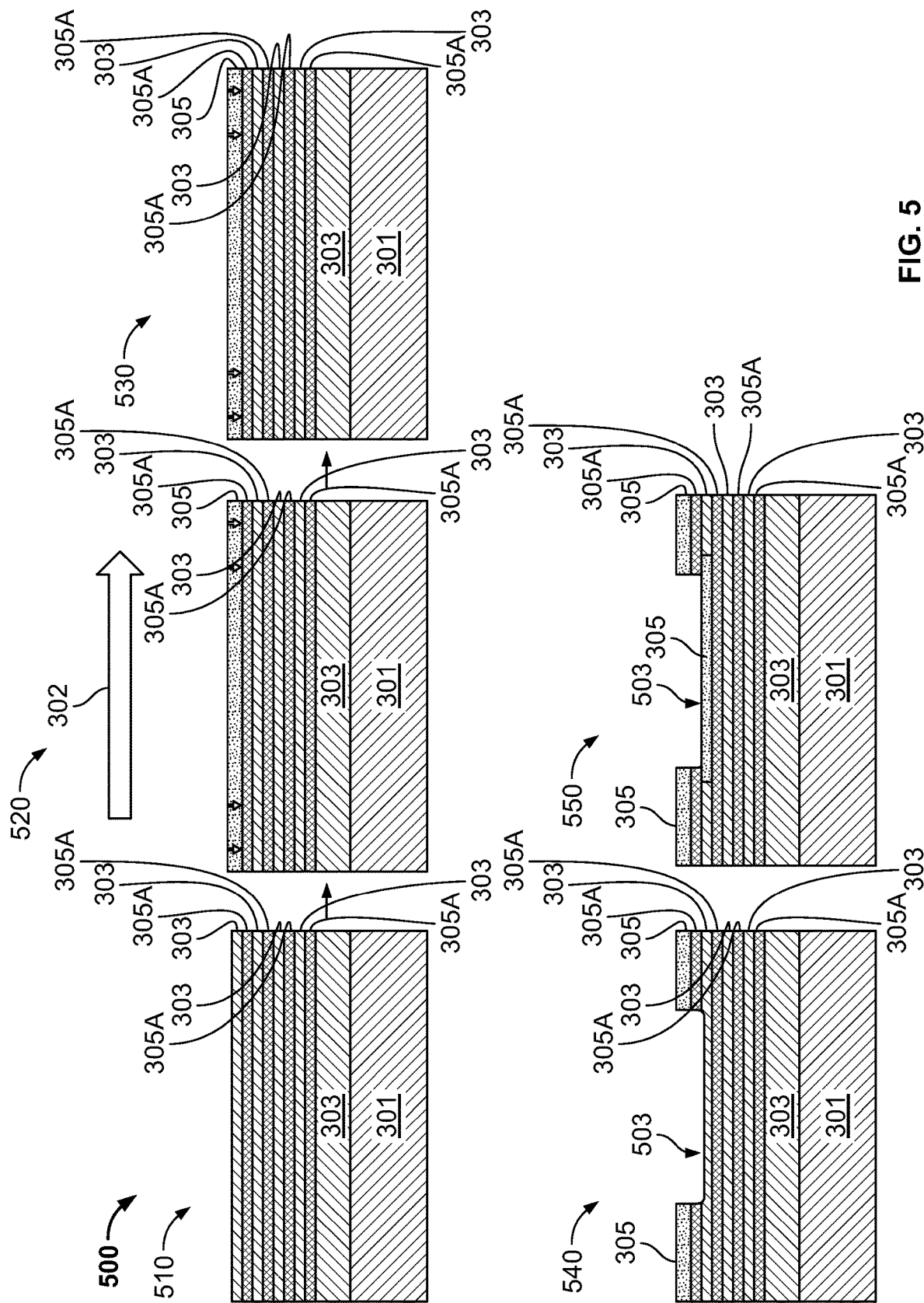
FIG. 5 illustrates, in cross section, a process of a ceramic substrate having a multilayer environmental barrier coating in accordance with embodiments of the present disclosure thereon in operation.

Referring now to FIG. 5, illustrated is a process flow diagram 500 utilizing cross sectional views (510, 520, 530, 540, and 550) of a ceramic substrate 301 coated with a rare earth disilicate EBC in a multilayer configuration, in accordance with some embodiments of the present disclosure. As shown in view 510, the rare earth disilicate EBC is deposited by conventional techniques (APS, slurry, PVD, etc.) in an initial layer 303 that is directly adjacent to and abutting substrate 301, which is thick enough to provide the required oxidation protection to the substrate 301. In some embodiments, a thickness of about 1.5 mils to about 15 mils, or about 1.5 to about 3 mils, or about 2 mils is needed. On top of this initial, relatively thick EBC layer 303, several (or a plurality of) alternating layers of a rare earth monosilicate material 305A (which can include the same or different rare earth cations) (note that reference numeral 305A is used, instead of 305, to indicate that this monosilicate layer is deposited (not formed via decomposition of the disilicate phase) and is densified/sintered (not porous as is the decomposed version of the monosilicate phase)) and the EBC 303 are deposited (APS, slurry, PVD, etc.) and sintered on the initial EBC 303 outer surface. As illustrated in view 510, four pairs of alternating layers 305A/303 are formed; however, in other embodiments, more or fewer alternating pairs may be provided, such as two, three, five, six, or more. Ideally, the final (outermost) layer is the EBC 303. In many embodiments, the rare earth element of the disilicate EBC 303 will be the same as used in deposited in monosilicate material layers 305A, although in some instances they may be different. These alternating layers 305A, 303 may each individually be relatively thin as compared with the initial EBC 303 layer, for example from about 0.5 mils to about 2 mils, or about 0.5 mils to about 1.5 mils, or about 0.5 mils to about 1 mil.

During operation, as shown in view 520, the exposed disilicate EBC (i.e. outermost alternating layer 303) will form a transition gradient to a porous rare earth monosilicate layer 305 over extended times above 2400° F. Eventually, the full thickness of the thin top layer 303 will transform to porous monosilicate 305, but the transition will not be able to continue because the stable (as deposited and sintered) monosilicate layer 305A underneath is reached. If the total thickness of the layer 305 is minimal (for example, less than about 1.5 mils), the CTE mismatch is not high enough to cause delamination of the layer 305. Continued operation above 2400° F. thus does not result in spallation even after the outermost layer 303 have been fully converted to porous monosilicate 305, as indicated in view 530. Accordingly, if the alternation layers are thin enough (less than 1.5 mils as indicated above), high CTE mismatch stresses are not able to form, and the likelihood of spallation is minimized Thus, this multilayer configuration helps further manage the CTE mismatch stresses caused by the thermal gradient across the coating.

Moreover, as indicated at view 540, if for some reason, a portion of these thin protective alternating layers 303/305A are lost through spallation, blade incursion, etc. (see void 503 in views 540, 550), the interface between layers acts as a preferred spallation point and localizes the spallation to only the minimum number of layers. The newly exposed thin EBC layer 303 will transform again to porous monosilicate 305, as shown in view 550, until the next lowest as-deposited monosilicate layer 305A is reached and a stable coating is achieved again, within void 503.

Accordingly, protective multilayer EBC systems for gas turbine engine applications and methods for fabricating such protective coating systems have been provided. The disclosed embodiments beneficially provide a novel approach to creating an EBC for SiN and SiC—SiC substrate materials by alternating a plurality of thin layers of a rare earth monosilicate material and a rare earth disilicate EBC, on top of a relatively thicker layer of the rare earth EBC, to allow the operational use temperature to be increased to from about 2600° F. to about 2800° F. As such, the present disclosure has provided an improved EBC and method to apply the coating for a high temperature (>2600° F. (>1425° C.)) barrier between the oxidizing environment of a HPT section and a substrate of silicon nitride or silicon carbide. The present disclosure has also beneficially provided an EBC over a silicon-based substrate that will resist delamination during cyclic heating to such high operating temperatures.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A multilayer protective coating system comprising:
a turbine engine component substrate formed of a ceramic material or a ceramic matrix composite material;
an environmental barrier coating layer comprising a rare earth disilicate material deposited directly on the substrate; and
a plurality of pairs of alternating layers of the rare earth disilicate material and a rare earth monosilicate material deposited and sintered directly on the environmental barrier coating layer,
wherein each layer of the plurality of pairs of alternating layers is relative less thick as compared with the environmental barrier coating layer;
wherein a single layer of the rare earth disilicate material defines an outermost surface of an entirety of the plurality of pairs of alternating layers.

2. The multilayer protective coating system of claim 1, wherein the ceramic material is a silicon nitride ($Si_3N_4$) material or the ceramic matrix composite material is a silicon carbide—silicon carbide (SiC—SiC) material.

3. The multilayer protective coating system of claim 1, wherein the environmental barrier coating layer has a thickness of about 1.5 mils to about 15 mils.

4. The multilayer protective coating system of claim 3, wherein the environmental barrier coating layer has a thickness of about 1.5 mils to about 3 mils.

5. The multilayer protective coating system of claim 1, wherein the rare earth disilicate material comprises a rare earth element that is selected from the group consisting of: Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu).

6. The multilayer protective coating system of claim 1, wherein the rare earth monosilicate material comprises a rare earth element that is, independently from the rare earth disilicate material, selected from the group consisting of: Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu).

7. The multilayer protective coating system of claim 1, wherein the plurality of pairs of alternating layers comprise two or more pairs of alternating layers.

8. The multilayer protective coating system of claim 7, wherein the plurality of pairs of alternating layers comprise three or more pairs of alternating layers.

9. The multilayer protective coating system of claim 1, wherein each layer of the plurality of pairs of alternating layers individually has a thickness of about 0.5 mils to about 2 mils.

10. The multilayer protective coating system of claim 9, wherein each layer of the plurality of pairs of alternating layers individually has a thickness of about 0.5 mils to about 1.5 mils.

11. A method of applying a multilayer protective coating to a substrate comprises the steps of:
    providing or obtaining a turbine engine component substrate formed of a ceramic material or a ceramic matrix composite material;
    depositing an environmental barrier coating layer comprising a rare earth disilicate material directly on the substrate; and
    depositing and sintering a plurality of pairs of alternating layers of the rare earth disilicate material and a rare earth monosilicate material directly on the environmental barrier coating layer,
    wherein each layer of the plurality of pairs of alternating layers is relative less thick as compared with the environmental barrier coating layer;
    wherein a single layer of the rare earth disilicate material defines an outermost surface of an entirety of the plurality of pairs of alternating layers.

12. The method of claim 11, wherein the ceramic material is a silicon nitride ($Si_3N_4$) material or the ceramic matrix composite material is a silicon carbide—silicon carbide (SiC—SiC) material.

13. The method of claim 11, wherein the environmental barrier coating layer has a thickness of about 1.5 mils to about 15 mils.

14. The method of claim 13, wherein the environmental barrier coating layer has a thickness of about 1.5 mils to about 3 mils.

15. The method of claim 11, wherein the rare earth disilicate material comprises a rare earth element that is selected from the group consisting of: Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu).

16. The method of claim 11, wherein the rare earth monosilicate material comprises a rare earth element that is, independently from the rare earth disilicate material, selected from the group consisting of: Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu).

17. The method of claim 11, wherein the plurality of pairs of alternating layers comprise two or more pairs of alternating layers.

18. The method of claim 17, wherein the plurality of pairs of alternating layers comprise three or more pairs of alternating layers.

19. The method of claim 11, wherein each layer of the plurality of pairs of alternating layers individually has a thickness of about 0.5 mils to about 2 mils.

20. The method of claim 19, wherein each layer of the plurality of pairs of alternating layers individually has a thickness of about 0.5 mils to about 1.5 mils.

* * * * *